US008831387B2

(12) United States Patent
Nakai et al.

(10) Patent No.: US 8,831,387 B2
(45) Date of Patent: Sep. 9, 2014

(54) OPTICAL DEVICE UTILIZING OPTICAL WAVEGUIDE AND DISPLAY DEVICE

(75) Inventors: Yutaka Nakai, Kanagawa (JP); Tsuyoshi Hioki, Kanagawa (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 254 days.

(21) Appl. No.: 13/368,891

(22) Filed: Feb. 8, 2012

(65) Prior Publication Data
US 2012/0207431 A1    Aug. 16, 2012

Related U.S. Application Data

(63) Continuation of application No. PCT/JP2009/004007, filed on Apr. 21, 2009.

(51) Int. Cl.
*G02B 6/00* (2006.01)
*G02B 6/36* (2006.01)

(52) U.S. Cl.
USPC ............................................. 385/31; 385/147

(58) Field of Classification Search
USPC ............... 385/29–33, 16, 22, 23; 379/28, 93; 369/102; 359/244, 247, 262, 630
See application file for complete search history.

(56) References Cited

U.S. PATENT DOCUMENTS

| 5,737,458 | A  | * | 4/1998  | Wojnarowski et al. ......... 385/15 |
| 5,953,469 | A  |   | 9/1999  | Zhou |
| 6,836,497 | B1 | * | 12/2004 | Hatori ........................ 372/43.01 |
| 6,921,452 | B2 | * | 7/2005  | Veligdan ....................... 156/253 |
| 7,680,366 | B2 | * | 3/2010  | Yokino et al. .................... 385/14 |
| 8,152,339 | B2 | * | 4/2012  | Morgan ....................... 362/336 |
| 2003/0081900 | A1 | * | 5/2003 | Nashimoto ..................... 385/43 |
| 2004/0264911 | A1 | * | 12/2004 | Toeda et al. .................... 385/146 |
| 2006/0145098 | A1 | * | 7/2006 | Baek et al. .................. 250/493.1 |
| 2008/0232753 | A1 | * | 9/2008 | Fujii et al. ..................... 385/126 |
| 2009/0010020 | A1 | * | 1/2009 | Katsumata et al. ........... 362/554 |
| 2013/0223793 | A1 | * | 8/2013 | Kim et al. ....................... 385/18 |

FOREIGN PATENT DOCUMENTS

| JP | 2002-040339 A | 2/2002 |
| JP | 2002-150820 A | 5/2002 |
| JP | 2006-154406 A | 6/2006 |
| JP | 2007-005221 A | 1/2007 |
| JP | 2009-169157 A | 7/2009 |

OTHER PUBLICATIONS

International Search Report dated Dec. 28, 2009 from PCT/JP2009/004007.

* cited by examiner

*Primary Examiner* — Akm Enayet Ullah
(74) *Attorney, Agent, or Firm* — Ohlandt, Greeley, Ruggiero & Perle, L.L.P.

(57) ABSTRACT

In one embodiment, in an optical device, a bar-shaped optical waveguide has either a polygonal or circular cross-sectional shape. A light entry portion is formed in a circumferential area of a first-end surface of the optical waveguide. The light entry portion includes a sloping surface having a normal vector containing a component in a circumferential direction of the first-end surface. An incident light beam travels towards a second-end surface of the optical waveguide while repeating total reflections on a side surface of the optical waveguide. The incident light beam travels without passing through a central portion in a cross section of the optical waveguide. A light exit portion is formed in the side surface of the optical waveguide. The light exit portion is configured to let the light beam in the optical waveguide out of the optical waveguide.

15 Claims, 13 Drawing Sheets

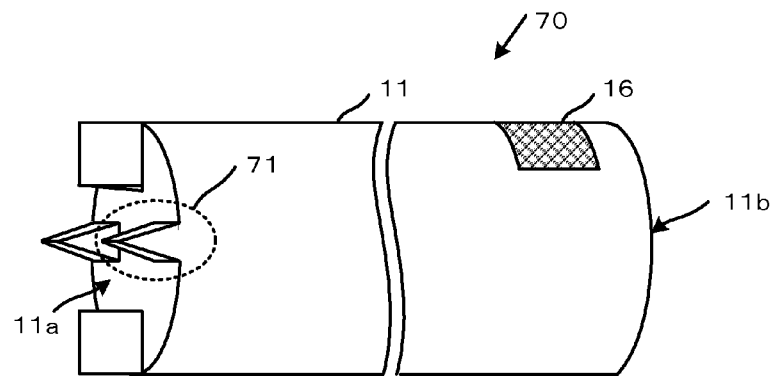
FIG. 7A
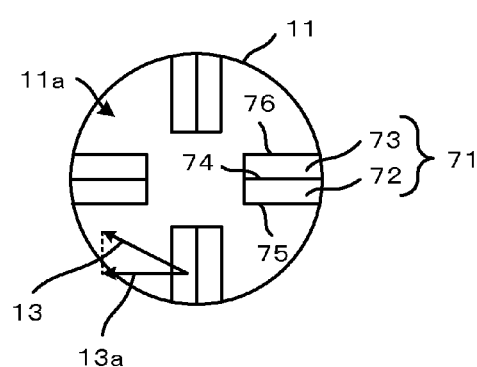 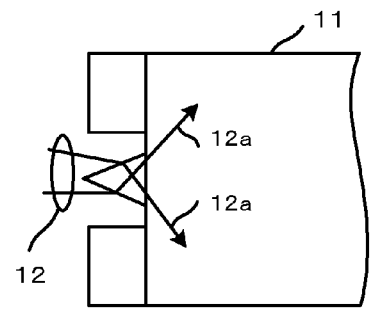
FIG. 7B          FIG. 7C
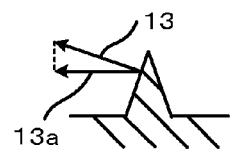
FIG. 7D

US 8,831,387 B2

OPTICAL DEVICE UTILIZING OPTICAL WAVEGUIDE AND DISPLAY DEVICE

CROSS REFERENCE TO RELATED APPLICATION

This is a Continuation application of PCT Application No. PCT/JP2009/004007, filed Aug. 21, 2009, the entire contents of which are incorporated herein by reference.

FIELD

Embodiments described herein relate generally to an optical device utilizing an optical waveguide and a display device.

BACKGROUND

Heretofore, optical devices including an optical waveguide and a light-extraction mechanism, and display devices using the optical devices have been known (see, for example, Description of U.S. Pat. No. 5,953,469). Here, the optical waveguide is configured to guide light entered from a first-end surface towards a second-end surface. The light-extraction mechanism is configured to be mechanically in contact with a side surface of the optical waveguide and thereby to extract the light beams from the side surface of the optical waveguide.

In this optical device, the optical waveguide has the first-end surface cut obliquely. The optical waveguide is irradiated with light beams in the direction orthogonal to the obliquely-cut surface, and guides the light beams to the second-end surface while repeatedly causing total reflections of the light beams on the side surface.

When this optical device is formed with too large a cut angle of the first-end surface in an attempt to increase the number of total reflections per unit length, a larger proportion of the incident light beams in the optical waveguide fails to meet the conditions for the total reflections on the side surface and leak out of the optical waveguide.

In addition, an increase of light components incident at a shallow angle with respect to the first-end surface leads to an increase of a Fresnel reflection loss and consequently a reduction of the light beams entering the optical waveguide. Hence, fewer light beams can reach the light-extraction mechanism, resulting in lower light-extraction efficiency. For this reason, there is a certain limit on the improvement in the light-extraction efficiency.

BRIEF DESCRIPTION OF THE DRAWINGS

FIGS. 7A to 7D are diagrams illustrating an optical device according to a fourth embodiment;

DETAILED DESCRIPTION

Figure 1A:
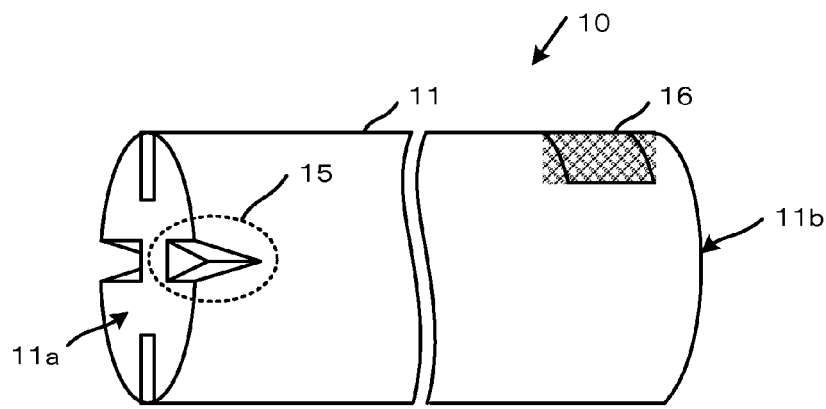
FIGS. 1A to 1D are diagrams illustrating an optical device according to a first embodiment.

In one embodiment, in an optical device, a bar-shaped optical waveguide has either a polygonal or circular cross-sectional shape. A light entry portion is formed in a circumferential area of a first-end surface of the optical waveguide. The light entry portion includes a sloping surface having a normal vector containing a component in a circumferential direction of the first-end surface. An incident light beam travels towards a second-end surface of the optical waveguide while repeating total reflections on a side surface of the optical waveguide. The incident light beam travels without passing through a central portion in a cross section of the optical waveguide. A light exit portion is formed in the side surface of the optical waveguide. The light exit portion is configured to let the light beam in the optical waveguide out of the optical waveguide.

Hereinafter, further embodiments will be described with reference to the drawings. In the drawings, same reference characters denote the same or similar portions.

First Embodiment

Figures 1B, 1C:
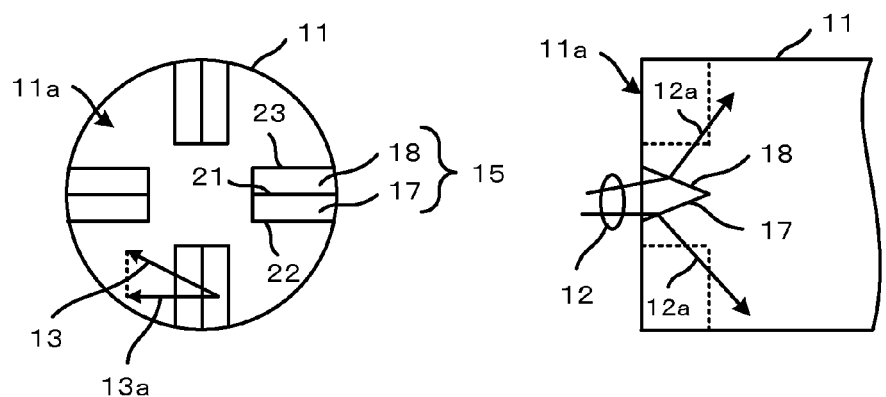
Figure 1D:
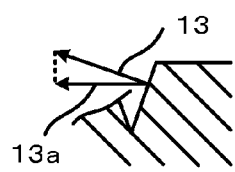

An optical device according to a first embodiment will be described with reference to FIG. 1. FIGS. 1A to 1D are diagrams illustrating the optical device. FIG. 1A is a perspective view of the optical device. FIG. 1B is a front elevation view of the optical device. FIG. 1C is a side elevation view of a first end portion of the optical device. FIG. 1D is a diagram to describe a normal vector to a sloping surface.

As FIGS. 1A to 1D show, an optical device 10 of the first embodiment includes a bar-shaped optical waveguide 11, a light entry portion 15 formed in a circumferential area of a first-end surface 11a of the optical waveguide 11, and a light exit portion 16 formed in the side surface of the optical waveguide 11.

The optical waveguide 11 has a circular sectional shape, and guides the incident light entered through the first-end surface 11a towards a second-end surface 11b. The optical waveguide 11 is a multimode optical fiber made of PMMA (polymethylmethacrylate), for example, and having a diameter of 0.5 mm or larger.

The light entry portion 15 is formed in the circumferential area of the first-end surface 11a of the optical waveguide 11. In FIGS. 1A and 1B, four light entry portions 15 are formed on the two lines dividing the first-end surface 11a into four sections. Each of the light entry portions 15 is formed to have a V-shaped groove structure including a first sloping surface 17 and a second sloping surface 18 intersecting the first sloping surface 17. The first sloping surface 17 and the second sloping surface 18 are flat surfaces, and are formed symmetrically with respect to a normal line to the first-end surface 11a of the optical waveguide 11.

In each light entry portion 15, a V-shaped groove is dug from the first-end surface 11a towards the second-end surface 11b of the optical waveguide 11. To be more specific, in each light entry portion 15, a deepest portion of the V-shaped groove, i.e., a first intersection line 21 where the first sloping surface 17 intersects the second sloping surface 18, is at a certain predetermined distance from the first-end surface 11a towards the second-end surface 11b of the optical waveguide 11, and extends from the outer edge towards the center of the optical waveguide 11. In addition, a second intersection line 22 where the first sloping surface 17 intersects the first-end surface 11a and a third intersection line 23 where the second sloping surface 18 intersects the first-end surface 11a extend from the outer edge towards the center of the optical waveguide 11.

Each light entry portion 15 can be formed by pressing a heated die having a ridge with a wedge shape, that is, an inverted shape of the light entry portion 15, onto the first-end surface 11a of the optical waveguide 11.

With the above-described configuration, in the light entry portions 15, normal vectors 13 to the first sloping surface 17 and the second sloping surface 18 intersect orthogonally the radial-direction vector of the optical waveguide 11. Hence, the normal vector 13 has a circumferential-direction component 13a, but has no radial-direction component.

Accordingly, light beams 12 having entered each of the light entry portions 15 are refracted by the first sloping surface 17 and the second sloping surface 18. Then, the refracted light beams travel towards the side surface of the optical waveguide 11, and thus form skew components (twisting components travelling along the side surface of the optical waveguide 11). The light beams 12a travelling towards the side surface spirally travels towards the second-end surface 11b while repeating total reflections on the side surface without passing through the central portion, in the cross section, of the optical waveguide 11 as will be described later.

The light exit portion 16 is designed to let out the light beams travelling inside the optical waveguide 11. The light exit portion 16 of the first embodiment is a roughly-finished surface region formed in the side surface of the optical waveguide 11. When the light beams 12a travelling inside the optical waveguide 11 while repeating the total reflections reach the roughly-finished surface region, the conditions for the total reflections are no longer satisfied. Hence, the light beams 12a are scattered by the roughly-finished surface region, and then exit out of the optical waveguide 11.

Figure 2:
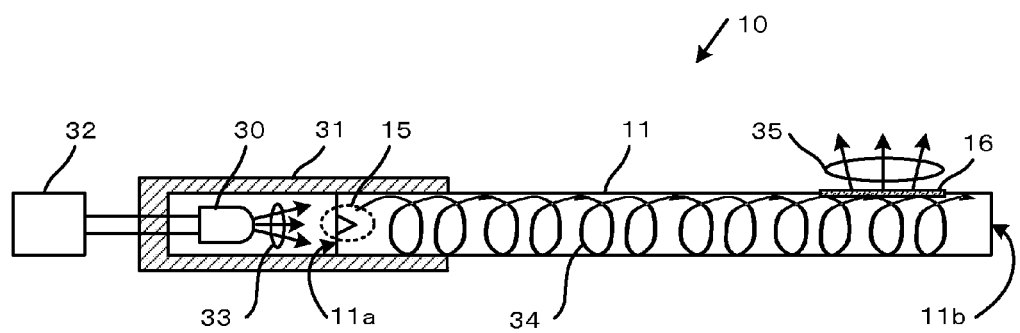
FIG. 2 is a diagram illustrating the optical device to which a light source is attached according to the first embodiment.

FIG. 2 is a diagram illustrating the optical device 10 to which a light source is attached. As FIG. 2 shows, an LED (light emitting diode) light source 30 is provided on the bottom of a pipe 31 made of a metal with high reflectance, such as aluminum, and is connected to an external power source 32. The optical waveguide 11 on the first-end surface 11a side is inserted into the pipe 31, and thus the first-end surface 11a of the optical waveguide 11 faces squarely the light source 30.

The light beams 33 emitted from the light source 30 enter the optical waveguide 11 through the light entry portion 15, and travel spirally towards the second-end surface 11b while repeating total reflections on the side surface of the optical waveguide 11. The light beams 35 reaching the light exit portion 16 among the guided light beams 34 exit from the optical waveguide 11.

Figure 3:
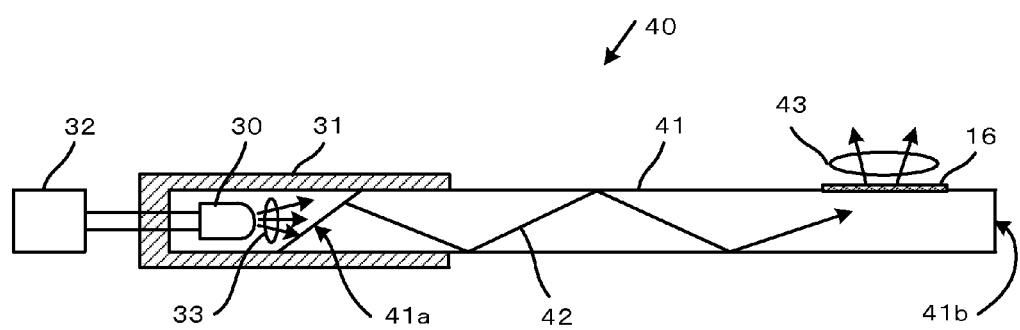
FIG. 3 is a diagram illustrating an optical device of a comparative example, to which a light source is attached according to the first embodiment.

The propagation route of the light beams in the optical waveguide 11 of the first embodiment will be described in detail next by comparing with that of a comparative example. The comparative example mentioned above is an optical device including an optical waveguide with an obliquely-cut first-end surface. FIG. 3 is a diagram illustrating the optical device of the comparative example, to which a light source is attached.

As FIG. 3 shows, an optical device 40 of the comparative example includes an optical waveguide 41 with an obliquely-cut first-end surface 41a. The optical waveguide 41 is inserted into the pipe 31 with the first-end surface 41a being the lead, and thus the first-end surface 41a of the optical waveguide 41 faces obliquely the light source 30.

The light beams 33 emitted from the light source 30 enter the optical waveguide 41 through the obliquely-cut first-end surface 41a, and travel towards the second-end surface 41b while repeating total reflections on the side surface of the optical waveguide 41. The light beams 43 reaching the light exit portion 16 among the guided light beams 42 exit from the optical waveguide 41.

Figure 4A:
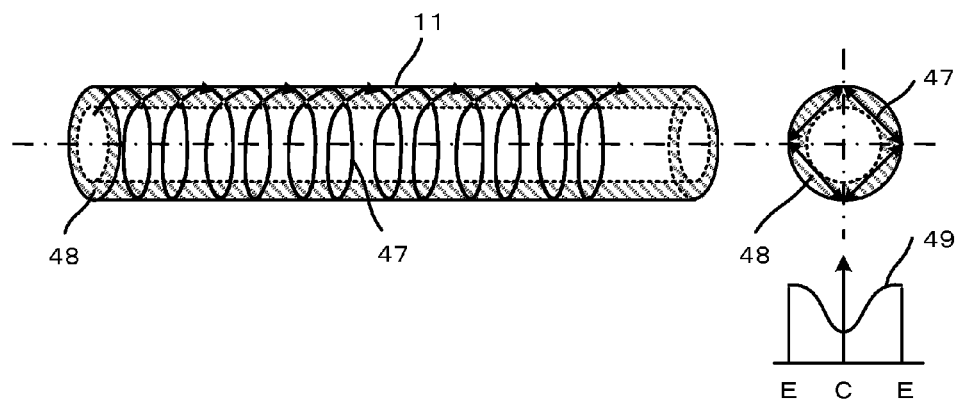
FIGS. 4A and 4B are diagrams illustrating comparison of the light-propagation route of the optical device with that of the comparative example according to the first embodiment.
Figure 4B:
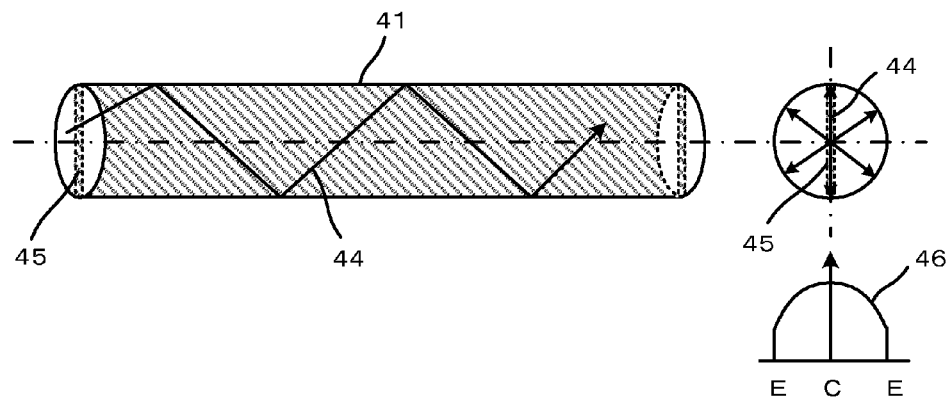

FIGS. 4A and 4B show comparison of the light-propagation route of the optical device of the first embodiment with that of the comparative example. FIG. 4A is a diagram illustrating the light-propagation route of the optical device of the first embodiment. FIG. 4B is a diagram illustrating the light-propagation route of the optical device of the comparative example. The light-propagation route of the comparative example will be described first.

As FIG. 4B shows, in the optical waveguide 41 of the comparative example, the light beams 44 having entered the optical waveguide 41 through the obliquely-cut first-end surface 41a (not illustrated) are propagated within a plate-like region 45 (indicated by the hatching in FIG. 4B)—extending in the center of the optical waveguide 41—while repeating total reflections on the side surface. The light beams shown in a section including the center line of the optical waveguide 41 are referred to as the meridian component.

Hence, the light-intensity distribution 46 in the radial direction of the optical waveguide 41 shows a convex-shaped distribution with higher intensities in the central portions (point C and the vicinity in FIG. 4B) and lower intensities in the edge portions (points E and the vicinities). This distribution means that fewer light beams reach the light exit portion 16 than those passing through the central portion of the optical waveguide 41.

In contrast, as FIG. 4A shows, in the optical waveguide 11 of the first embodiment, the light beams 47 having entered the optical waveguide 11 through the light entry portions 15 (not illustrated) are propagated within a cylindrical region (indicated by hatching in FIG. 4A) 48 spirally with finer pitches while repeating total reflections on the side surface. The light beams travelling along the circumference of the optical waveguide 11 are referred to as the skew components.

Hence, the light-intensity distribution 49 in the radial direction of the optical waveguide 11 shows a concave-shaped distribution with lower intensities in the central portions (point C and the vicinity in FIG. 4A) and higher intensities in the edge portions (points E and the vicinities). This distribution means that more light beams reach the light exit portion 16 than those passing through the central portion of the optical waveguide 11.

The light-intensity distribution 49 in the radial direction can be visually checked by pressing a sheet of white paper onto the second-end surface 11b of the optical waveguide 11 and observing the intensity of light projected on the sheet of white paper from the second-end surface 11b, for example. When the circumferential area of the optical waveguide 11 looks brighter than the central portion, the guided light beams contain more skew components. The light-intensity distribution 46 in the radial direction can be visually checked in a similar manner.

The light beams 47 travelling spirally along the circumference of the optical waveguide 11 repeat more total reflections per unit length than the light beams 44 travelling straight along the axis of the optical waveguide 41. So the light beams 47 are more likely to reach the light exit portion 16 than the light beams 44 can reach the light exit portion 16. To put it differently, the more the number of total reflections per unit length becomes, the more light beams can reach the light exit portion 16.

In a case where the first-end surface 41a of the optical waveguide 41 of the comparative example is cut obliquely at an angle of 60° and the deepest end of the V-shaped groove of each light entry portion 15 of the first embodiment has an angle ranging from 10° to 40°, the light-extraction efficiency of the first embodiment is improved from that of the comparative example by 70% (1.7 times).

As has been described thus far, the optical device 10 of the first embodiment includes the light entry portions 15 formed in the circumferential area of the first-end surface 11a of the optical waveguide 11. The light entry portions 15 each includes the first sloping surface 17 and the second sloping surface 18 intersecting the first sloping surface 17, as slopping surfaces with the normal vector 13 containing the component 13a in the circumferential direction of the first-end surface 11a so as to cause the incident light beams 12 to travel spirally towards the second-end surface 11b while repeating total reflections on the side surface of the optical waveguide 11 without passing through the central portion, in the cross section, of the optical waveguide 11. The light entry portion 15 forms a V-shaped groove in which the first intersection line 21 of the first sloping surface 17 and the second sloping surface 18 extends from the outer edge towards the center, and in which the second intersection line 22 of the first sloping surface 17 and the first-end surface 11a is parallel to the third intersection line 23 of the second sloping surface 18 and the first-end surface 11a.

Hence, the light beams having entered the optical waveguide 11 are converted to the skew components and are propagated spirally while repeating total reflections on the side surface. Accordingly, the number of total reflections per unit length is increased, so that a larger part of the incident light beams can reach the light exit portion 16. The optical device thus obtained can have higher efficiency in extracting light from the side surface of the optical waveguide.

The description of the first embodiment assumes that the optical waveguide 11 has a circular-shaped cross section. However, similar effects can be obtained when the optical waveguide 11 has a polygonal cross section. Nevertheless, an optical waveguide with a polygonal cross-section having a smaller number of vertices, such as a wedge-like shape and a quadrilateral shape can produce fewer effects of the skew components. So, it is preferable that the optical waveguide 11 have a hexagonal or higher order polygonal cross section.

In addition, the description of the first embodiment assumes that the optical waveguide 11 is made of PMMA (the refractive index n is approximately 1.5). However, other transparent materials such as polyimide (n is approximately 1.7) and flint glass (n is approximately 1.9) may be used instead. A material with a higher refractive index has a smaller total-reflection angle, and has an advantage of increasing the light beams with more total reflections per unit length.

In addition, the description of the first embodiment assumes that the first and the second sloping surfaces 17 and 18 forming a V-shaped groove are flat surfaces. However, these sloping surfaces 17 and 18 may be such curved surfaces as to form a U-shaped groove, for example, as long as these sloping surfaces 17 and 18 can deflect the light beams and thereby produce components propagated in the circumferential direction of the optical waveguide 11.

Here, an optical waveguide with a circular-shaped cross section, if having a sloping surface in a conical shape, is not suitable because the sloping surface has the normal vector containing only a component in the radial direction but containing no component in the circumferential direction. Likewise, an optical waveguide with a polygonal cross-sectional shape, if having sloping surfaces in a pyramid shape, is not suitable.

In addition, the description of the first embodiment assumes that four V-shaped grooves are formed in the optical waveguide 11. The number of V-shaped grooves, however, is not limited to a particular number. If, however, the adjacent V-shaped grooves are too close to each other, the deflected light beams 12a hit the adjacent V-shaped grooves inside the optical waveguide 11 and thus weaken the skew components. Accordingly, it is preferable to secure a certain adequate distance between two adjacent V-shaped grooves.

In addition, the description of the first embodiment assumes that the light exit portion 16 is a roughly-finished surface region. However, the light exit portion 16 may be formed as a cut-off portion of the side surface of the optical waveguide 11, or be provided as a transparent member, other than air, which is in contact with the side surface of the optical waveguide 11. A preferable transparent member is one having a larger refractive index than the optical waveguide 11 in view of improvement of the light-extraction efficiency.

Second Embodiment

Figure 5:
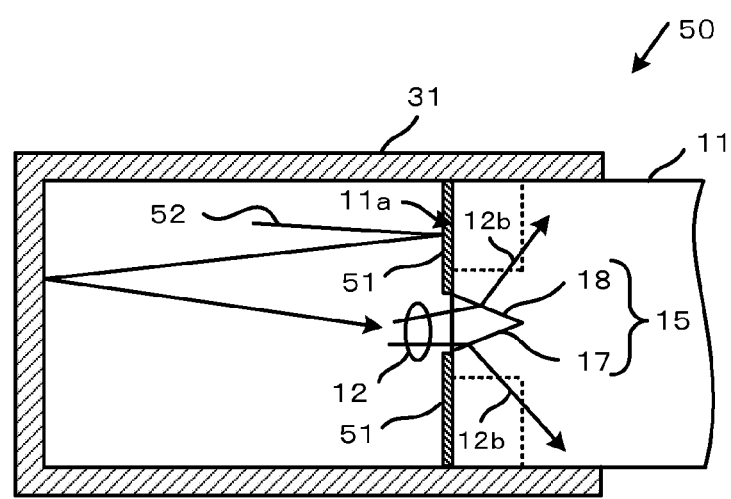
FIG. 5 is a diagram illustrating an optical device according to a second embodiment.

An optical device according to a second embodiment will be described with reference to FIG. 5. FIG. 5 is a diagram illustrating the optical device of the second embodiment. In the following description of the second embodiment, those portions identical to the respective counterparts in the first embodiment are denoted by the same reference numerals used in the first embodiment. No description is given of such identical portions, and the following description is dedicated to the different portions. The second embodiment differs from the first embodiment in that a light reflective film is formed on the first-end surface of the optical waveguide except the surfaces of the light entry portions.

Specifically, as FIG. 5 shows, in an optical device 50 of the second embodiment, a light reflective film 51 is formed on the first-end surface 11a of the optical waveguide 11 except the surfaces of the light entry portions 15. The light reflective film 51 is a vacuum-deposited or plated aluminum film, for example.

The light beams 52 not having entered the light entry portions 15 are reflected by the light reflective film 51, and travel back to the surface of the light source 30 or back to the internal surface of the pipe 31. Then, the light beams are repeatedly reflected by the light reflective film 51, the surface of the light source 30, and the internal surface of the pipe 31 and then eventually enter the light entry portions 15 as the incident light beams 12. Hence, the efficiency in extracting light from the light exit portion 16 can be improved. Specifically, the light-extraction efficiency of the optical device 50 is higher than the light-extraction efficiency of the optical device 10 shown in FIG. 1 by approximately 20%.

When no such light reflective film 51 is formed, the light beams 52 not having entered the light entry portions 15 enter directly the optical waveguide 11, and most of the light beams thus entered travel in a linear fashion. Hence, the number of total reflections per unit length is small. So, the probability to contribute to the improvement in the light-extraction efficiency herein is not as high as the probability in the case of an optical device with the light reflective film.

As has been described thus far, in the optical device 50 of the second embodiment, the light reflective film 51 is formed on the first-end surface 11a of the optical waveguide 11 except the surfaces of the light entry portions 15. Hence, even the light beams 52 not having entered the light entry portions 15 can be made to enter the light entry portions 15. So the optical device 50 of the second embodiment has an advantageous effect of improving the light-extraction efficiency.

The description of the second embodiment assumes that the light reflective film 51 is made of aluminum. When the light reflective film 51 is made of a metal with higher reflectance than that of aluminum, such as gold or silver, still higher light-extraction efficiency can be expected. The light reflective film 51 is preferably formed on the entire first-end surface 11a of the optical waveguide 11 except the surfaces of the light entry portions 15. Nevertheless, a similar advantageous effect obtainable in the second embodiment can be obtained as long as at least a part of the first-end surface 11a is coated by the light reflective film 51.

Third Embodiment

Figure 6A:
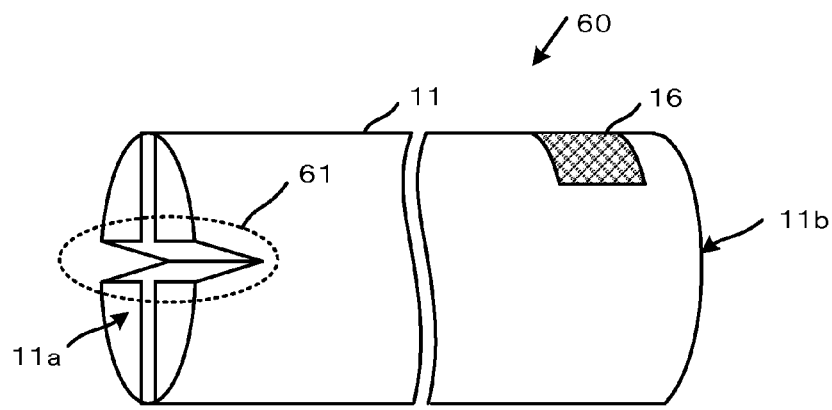
FIGS. 6A to 6C are diagrams illustrating an optical device according to a third embodiment.
Figures 6B, 6C:
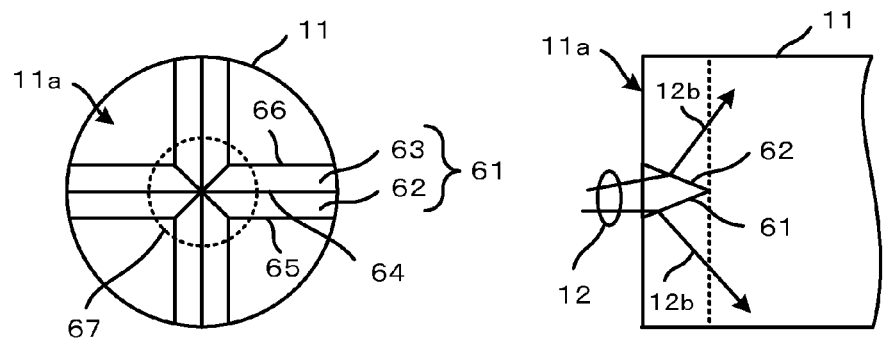

An optical device according to a third embodiment will be described with reference to FIGS. 6A to 6C. FIGS. 6A to 6C show diagrams illustrating an optical device of the third embodiment. FIG. 6A is a perspective view of the optical device. FIG. 6B is a front elevation view of the optical device. FIG. 6C is a side elevation view of a first end portion of the optical device.

In the following description of the third embodiment, those portions identical to the respective counterparts in the first embodiment are denoted by the same reference numerals used in the first embodiment. No description is given of such identical portions, and the following description is dedicated to the different portions. The third embodiment differs from the first embodiment in that each V-shaped groove, which extends from the outer edge towards the center of the first-end surface 11a of the optical waveguide 11 of the optical waveguide 11 in the first embodiment, extends further to reach the center of the first-end surface 11a.

Specifically, as FIGS. 6A to 6C show, each of light entry portions 61 of an optical device 60 of the third embodiment includes a first sloping surface 62 and a second sloping surface 63 intersecting the first sloping surface 62, and forms a V-shaped groove in which a first intersection line 64 of the first sloping surface 62 and the second sloping surface 63 extends from the outer edge to the center, and in which a second intersection line 65 of the first sloping surface 62 and the first-end surface 11a is parallel to a third intersection line 66 of the second sloping surface 63 and the first-end surface 11a. Four V-shaped grooves are arranged along the outer perimeter of the optical waveguide 11 and together form a cross shape. The four V-shaped grooves meet at the center of the first-end surface 11a. The normal vectors (not illustrated) to the first sloping surface 62 and the second sloping surface 63 have only components in the circumferential direction, but have no components in the radial direction.

To form the light entry portions 61, a V-shaped blade having a tip end with an angle ranging from 10° to 40° may be used to make cross-shaped cuts in the first-end surface 11a of the optical waveguide 11. After the cuts are made by the blade, the burrs formed in the cutting are removed by polishing the first-end surface 11a.

The light beams 12 having entered the circumferential area among all the incident light beams having entered the V-shaped grooves are converted to skew components. Though the light beams having entered a central portion 67 are less likely to be converted to skew components, the light beams are converted to obliquely-incident components, resulting in smaller loss.

The optical device 60 achieves higher light-extraction efficiency than the light-extraction efficiency of the optical device 40 of the comparative example by approximately 20%. When, in addition, the optical device 60 is provided with the light reflective film 51 shown in FIG. 5, light-extraction efficiency higher by approximately 50% is achieved.

As has been described thus far, the light entry portions 61 of the optical device 60 of the third embodiment have plural V-shaped grooves which extend from the outer edge to reach the center and which meet at the center of the first-end surface 11a. Consequently, the incident light beams entering the central portion 67 of the V-shaped grooves are converted to obliquely-incident components. The optical device 60 of the third embodiment has an advantageous effect of improving the light-extraction efficiency.

In addition, the light entry portions 15 shown in FIGS. 1A to 1D may be formed in the first-end surface 11a of the optical waveguide 11 except in the portion where the light entry portions 61 are formed. With the light entry portions 15, the area not contributing to the skew-component formation becomes smaller. Hence, still higher light-extraction efficiency can be achieved.

Fourth Embodiment

An optical device according to a fourth embodiment will be described with reference to FIGS. 7A to 7D. FIGS. 7A to 7D are diagrams illustrating the optical device of the fourth embodiment. FIG. 7A is a perspective view of the optical device. FIG. 7B is a front elevation view of the optical device. FIG. 7C is a side elevation view of a first end portion of the optical device. FIG. 7D is a diagram to describe a normal vector to a sloping surface.

In the following description of the fourth embodiment, those portions identical to the respective counterparts in the first embodiment are denoted by the same reference numerals used in the first embodiment. No description is given of such identical portions, and the following description is dedicated to the different portions. The fourth embodiment differs from the first embodiment in that each light entry portion has a wedge-shaped ridge.

Specifically, as FIGS. 7A to 7D show, each of light entry portions 71 of an optical device 70 of the fourth embodiment includes a first sloping surface 72 and a second sloping surface 73 intersecting the first sloping surface 72, and forms a wedge-shaped ridge in which, a first intersection line 74 of the first sloping surface 72 and the second sloping surface 73 extends from the outer edge towards the center, and in which a second intersection line 75 of the first sloping surface 72 and the first-end surface 11a is parallel to a third intersection line 76 of the second sloping surface 73 and the first-end surface 11a. Four wedge-shaped ridges are arranged along the outer perimeter of the optical waveguide 11 and together form a cross shape. The four wedge-shaped ridges, however, do not meet one another.

The normal vector 13 to the first sloping surface 72 and the normal vector 13 to the second sloping surface 73 have only components 13a in the circumferential direction but have no components in the radial direction.

The incident light beams 12 having entered the light entry portions 71 are deflected at the first and second sloping surfaces 72 and 73, then travel towards the side surface of the optical waveguide 11, and thus form skew components. The light beams 12a travelling towards the side surface do not pass through the central portion of the optical guide 11 but travel spirally towards the second-end surface 11b while repeating total reflections on the side surface. The optical device 70 achieves higher light-extraction efficiency than the light-extraction efficiency of the optical device 40 of the comparative example by approximately 10%.

Each light entry portion 71 can be formed by pressing a heated die having a wedge shape, that is, an inverted shape of the light entry portion 71, onto the first-end surface 11a of the optical waveguide 11.

As has been described thus far, each light entry portion 71 of the optical device 70 of the fourth embodiment has a wedge-shaped ridge with the two side surfaces formed by the first sloping surface 72 and the second sloping surface 73.

Unlike the V-shaped grooves, the wedge-shaped ridges do not interfere the travelling of the light beams having been deflected and entered the optical waveguide 11. That is, the wedge-shaped ridges do not weaken the skew components. Accordingly, the wedge-shaped ridges have an advantage in that the wedge-shaped ridges can be provided more closely to one another than the V-shaped grooves. Note that the number of wedge-shaped ridges is not limited to a particular number.

Fifth Embodiment

Figure 8:
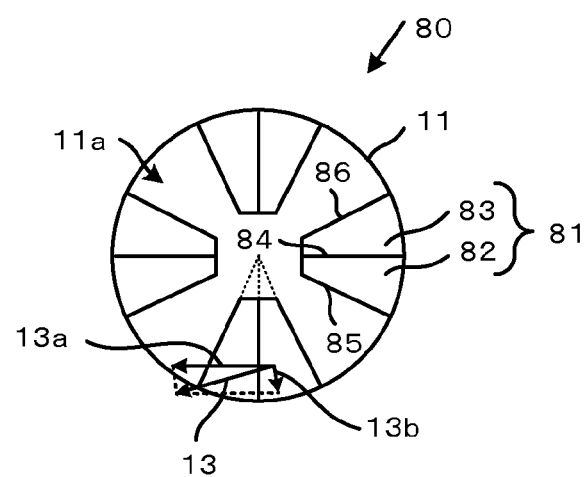
FIG. 8 is a diagram illustrating an optical device according to a fifth embodiment.

An optical device according to a fifth embodiment will be described with reference to FIG. 8. FIG. 8 is a front elevation view of the optical device of the fifth embodiment. In the following description of the fifth embodiment, those portions identical to the respective counterparts in the first embodiment are denoted by the same reference numerals used in the first embodiment. No description is given of such identical portions, and the following description is dedicated to the different portions. The fifth embodiment differs from the first embodiment in that the second intersection line and the third intersection line are gradually separated away from each other, that is, the width of each V-shaped groove is gradually increased.

Specifically, as FIG. 8 shows, each of light entry portions 81 of an optical device 80 of the fifth embodiment includes a first sloping surface 82 and a second sloping surface 83 intersecting the first sloping surface 82, and forms a gradually-widening V-shaped groove in which a first intersection line 84 of the first sloping surface 82 and the second sloping surface 83 extends from the outer edge towards the center of the first-end surface 11a of the optical waveguide 11, and in which a second intersection line 85 of the first sloping surface 82 and the first-end surface 11a and a third intersection line 86 of the second sloping surface 83 and the first-end surface 11a extend with a distance between the second intersection line 85 and the third intersection line 86 gradually widening from a center side towards the outer edge of the first-end surface 11a of the optical waveguide 11.

The extension lines of the first to third intersection lines 84, 85, 86 pass through the center of the first-end surface 11a, and are arranged in a radial fashion. Four gradually-widening V-shaped grooves are arranged along the outer perimeter of the optical waveguide 11 and together form a cross shape. The four gradually-widening V-shaped grooves do not meet one another.

The light beams 12 (not illustrated) entering the light entry portion 81 are deflected by the first and the second sloping surfaces 82, 83, then travel towards the side surface of the optical waveguide 11, and thus form skew components.

The normal vector 13 to the first sloping surface 82 and the normal vector 13 to the second sloping surface 83 have not only components 13a in the circumferential direction but also components 13b in the radial direction. The components 13b in the radial direction do not particularly contribute to the skew-component formation, but the arrangement of the first to third intersection lines 84, 85, 86 in a radial fashion allows a larger number of gradually-widening V-shaped grooves to be arranged more densely along the outer perimeter of the first-end surface 11a. Hence, the area contributing to the skew-component formation can be increased.

When the light reflective film 51 shown in FIG. 5 is formed on the first-end surface 11a except the surfaces of the light entry portions 81, the optical device 80 achieves light-extraction efficiency improved from the light-extraction efficiency of the optical device 40 of the comparative example by 50% (1.5 times).

As has been described thus far, the optical device 80 of the fifth embodiment includes the light entry portions 81, each of which has a gradually-widening V-shaped groove with the two side surfaces formed by the first sloping surface 82 and the second sloping surface 83. A larger number of the gradually-widening V-shaped grooves can be arranged more densely along the outer perimeter of the first-end surface 11a. Hence, the area contributing to the skew-component formation can be increased, and the light-extraction efficiency can be improved.

In addition, each light entry portion 81 may have a gradually-widening inverted-V-shaped ridge. Unlike the gradually-widening V-shaped grooves, the gradually-widening inverted-V-shaped ridges do not interfere the travelling of the light beams having been deflected and entered the optical waveguide 11. Hence, the gradually-widening inverted-V-shaped ridges do not weaken the skew components. Accordingly, a larger number of the gradually-widening inverted-V-shaped ridges can be arranged so densely without any spaces that each gradually-widening inverted-V-shaped ridge is in contact with the adjacent gradually-widening inverted-V-shaped ridges.

Sixth Embodiment

Figure 9:
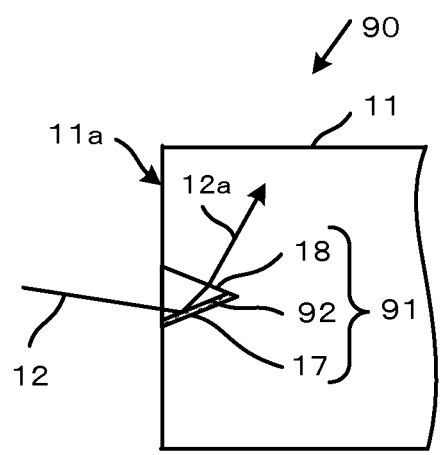
FIG. 9 is a diagram illustrating an optical device according to a sixth embodiment.

An optical device according to a sixth embodiment will be described with reference to FIG. 9. FIG. 9 is a side elevation view of the optical device of the sixth embodiment. In the following description of the sixth embodiment, those portions identical to the respective counterparts in the first embodiment are denoted by the same reference numerals used in the first embodiment. No description is given of such identical portions, and the following description is dedicated to the different portions. The sixth embodiment differs from the first embodiment in that one of the sloping surfaces is a light reflective surface.

Specifically, as FIG. 9 shows, an optical device 90 of the sixth embodiment includes light entry portions 91, each including a first sloping surface 17 coated with a light reflective film 92, which is an aluminum film, for example. The incident light beams 12 entering the first sloping surface 17 are reflected by the light reflective film 92, and then enter the opposite, second sloping surface 18, where the incident light beams are deflected. The deflected light beams enter the optical waveguide 11 through the second sloping surface 18.

The light reflective film 92 can greatly change the travelling direction of the incident light beams 12 entering the first sloping surface 17, and cause the light beams 12 to enter the second sloping surface 18 at larger incident angles. Hence, larger skew components can be produced.

The optical device 90 has light-extraction efficiency improved from the light-extraction efficiency of the optical device 40 of the comparative example by 20% (1.2 times).

As has been described thus far, the light entry portion 91 of the optical device 90 of the sixth embodiment is provided with the light reflective film 92 formed on the first sloping surface 17. Accordingly, larger skew components can be produced and light-extraction efficiency can be improved.

Seventh Embodiment

Figure 10:
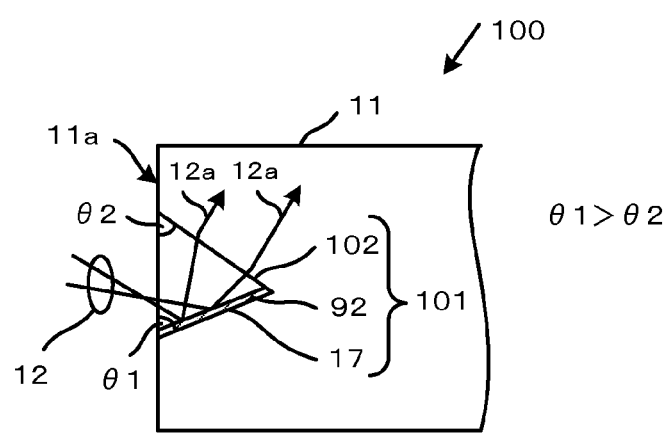
FIG. 10 is a diagram illustrating an optical device according to a seventh embodiment.

An optical device according to a seventh embodiment will be described with reference to FIG. 10. FIG. 10 is a side elevation view of the optical device of the seventh embodiment. In the following description of the seventh embodiment, those portions identical to the respective counterparts in the sixth embodiment are denoted by the same reference numerals used in the sixth embodiment. No description is given of such identical portions, and the following description is dedicated to the different portions. The seventh embodiment differs from the sixth embodiment in that the first and second sloping surfaces are arranged asymmetrically.

Specifically, as FIG. 10 shows, each of light entry portions 101 of an optical device 100 of the seventh embodiment includes a first sloping surface 17, a second sloping surface 102, and a light reflective film 92. The first sloping surface 17 intersects the first-end surface 11a at an angle θ1 whereas the second sloping surface 102 intersects the first-end surface 11a at an angle θ2 that is smaller than the angle θ1. The light reflective film 92 is formed on only the first sloping surface 17. The first sloping surface 17 and the second sloping surface 102 serve as the two side surfaces of a V-shaped groove asymmetrical with respect to the normal line to the first-end surface 11a of the optical waveguide 11.

In addition, the second sloping surface 102 has a larger area than the first sloping surface 17.

As has been described thus far, in each light entry portion 101 of the optical device 100 of the seventh embodiment, the area of the second sloping surface 102 is larger than the area of the first sloping surface 17. Hence, more light beams 12a reflected by the light reflective film 92 on the first sloping surface 17 can be taken in through the second sloping surface 102. Accordingly, the light-extraction efficiency can be improved. Specifically, the optical device 100 achieves light-extraction efficiency improved from the light-extraction efficiency of the optical device 40 of the comparative example by 40% (1.4 times).

Eighth Embodiment

Figure 11:
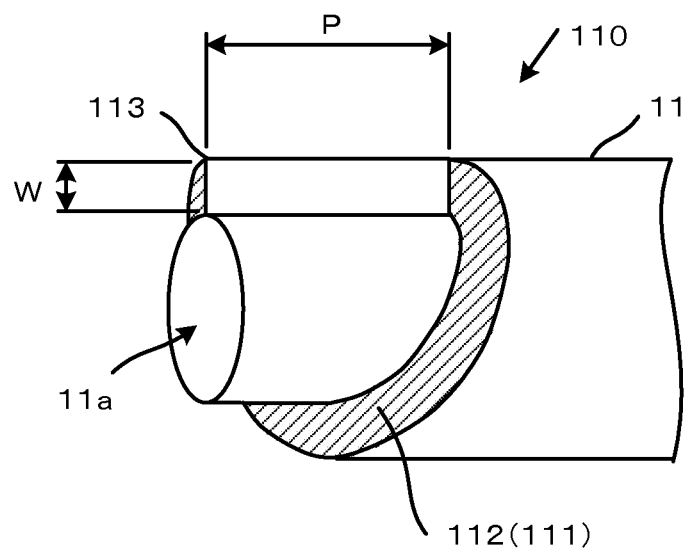
FIG. 11 is a diagram illustrating an optical device according to an eighth embodiment.

An optical device according to an eighth embodiment will be described with reference to FIG. 11. FIG. 11 is a perspective view of the optical device of the eighth embodiment. In the following description of the eighth embodiment, those portions identical to the respective counterparts in the first embodiment are denoted by the same reference numerals used in the first embodiment. No description is given of such identical portions, and the following description is dedicated to the different portions. The eighth embodiment differs from the first embodiment in that the light entry portion has a spiral-shaped sloping surface.

Specifically, as FIG. 11 shows, an optical device 110 of the eighth embodiment includes a light entry portion 111 with a spiral-shaped sloping surface 112 with a width W. The spiral-shaped sloping surface 112 starts from an arbitrarily-determined point on the first-end surface 11a, and makes a full circle around the optical waveguide 11 with a pitch P.

The width W of the spiral-shaped sloping surface 112 is equal to the length of the first intersection line 21 shown in FIG. 1B, for example. The pitch P is determined so that the sloping angle in the circumferential direction can be within a range from 5° to 20°, for example. The normal vector (not illustrated) to the spiral-shaped sloping surface 112 has only a component in the circumferential direction but has no component in the radial direction. The light beams (not illustrated) entering the spiral-shaped sloping surface 112 are deflected, then travel towards the side surface of the optical waveguide 11, and thus form skew components.

The spiral shaped sloping surface 112 is formed by, firstly bringing a tool bit for cutting into contact with the first-end surface 11a of the optical waveguide 11 by the width W, and then turning the optical waveguide 11 in a full circle while the tool bit for cutting is fed in the lengthwise direction of the optical waveguide 11 by a length equal to the pitch P.

As has been described thus far, the light entry portion 111 of the optical device 110 of the eighth embodiment has the spiral-shaped sloping surface 112 with the width W and the pitch P. The spiral-shaped sloping surface can have a similar light-extraction effect to that of the flat sloping surfaces.

The description of the eighth embodiment assumes that the single spiral-shaped sloping surface 112 makes a full circle around the optical waveguide 11. It is, however, possible to provide two spiral-shaped sloping surfaces each extending halfway around the optical waveguide 11 in an opposite direction. In this case, the maximum distance between the first-end surface 11a and each spiral-shaped sloping surface is decreased to half of the pitch P (=P/2). Hence, the incident light beams are more likely to enter the spiral-shaped sloping surface without being interfered by the central portion of the optical waveguide 11. Consequently, the efficiency with which the light beams enter the spiral-shaped sloping surfaces can be improved.

Ninth Embodiment

Figure 12:
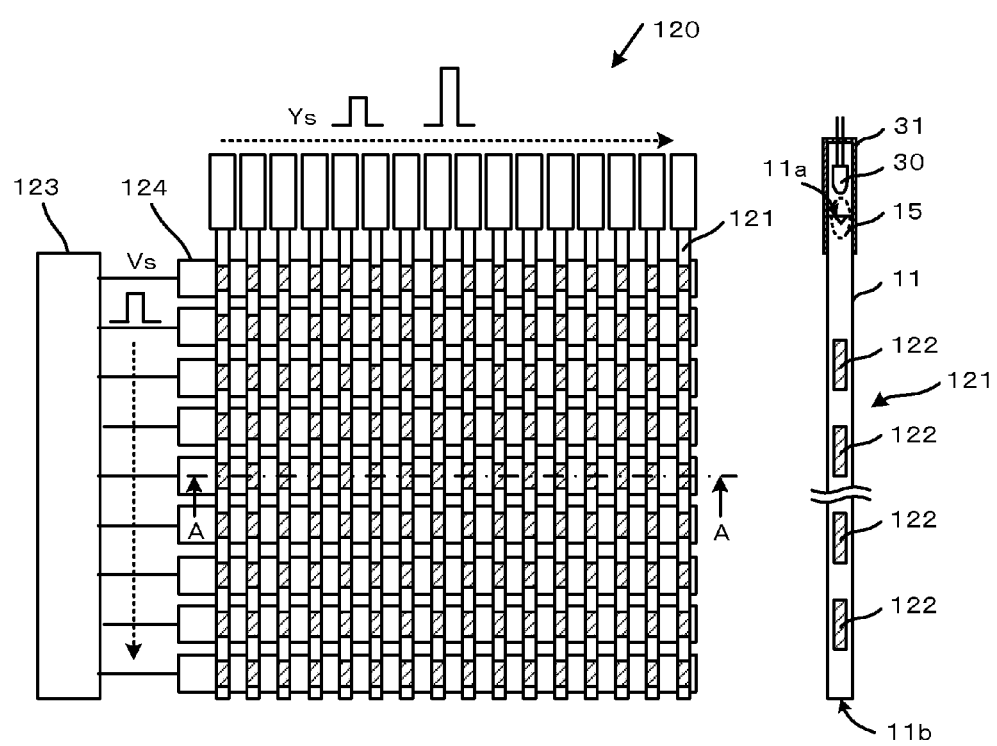
FIG. 12 is a diagram illustrating a display device according to a ninth embodiment.
Figure 13A:
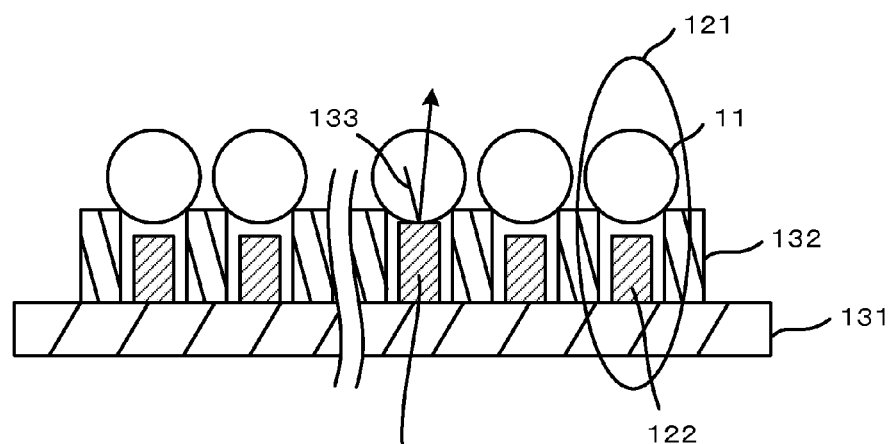
FIGS. 13A and 13B are cross-sectional view illustrating the main portion of the display device according to the ninth embodiment.
Figure 13B:
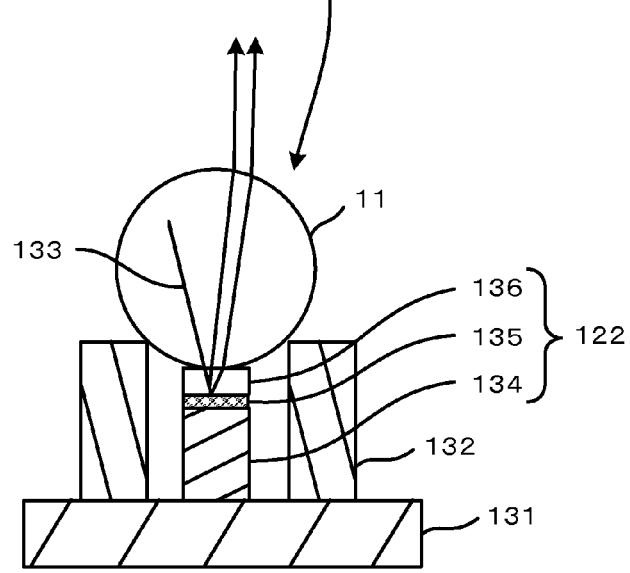

A display device according to a ninth embodiment of the invention will be described with reference to FIGS. 12 to 13B. FIG. 12 shows a plan view illustrating the display device of the ninth embodiment, and an enlarged view of a portion of the plan view. FIGS. 13A and 13B show a sectional view taken along the line A-A of FIG. 12 and seen as indicated by the arrows in FIG. 12, and an enlarged view of a portion of the sectional view.

As FIGS. 12 to 13B show, a display device 120 of the ninth embodiment includes light sources 30, plural bar-shaped optical devices 121, light exit portions 122 and a driving unit 123.

The optical devices 121 are arranged in columns. As in the first embodiment, each optical device 121 includes an optical waveguide 11 with a first-end surface 11a including light entry portions 15. In addition, in each optical device, a light source 30 is provided while directly facing (being opposed to) the first-end surface 11a of the optical waveguide 11. The optical waveguides 11 of the optical devices 121 are supported by plural bar-shaped support members 132 arranged side by side with one another on a substrate 131 at intervals narrower than the diameter of each optical waveguide 11.

Each light exit portion 122 is provided in a space formed by the corresponding optical waveguide 11, the corresponding two adjacent support members 132, and the substrate 131. The light exit portions 122 are arranged in the column direction, and are linearly arranged in the row direction. Each light exit portion 122 includes an actuator 134, a light reflective film 135, and a light scattering film 136. The actuator 134 is mounted on the substrate 131. The light reflective film 135 is formed on an end surface of the actuator 134, the end surface being the one facing the optical waveguide 11. The light scattering film 136 is formed on the light reflective film 135.

Specifically, the actuator 134 is a PZT (lead zirconate titanate) piezoelectric element, for example. The light reflective film 135 is a PET film with a 100-μm thickness coated with an aluminum film deposited to have a 0.1-μm thickness, for example. The light scattering film 136 is a polycarbonate film with a 100-μm thickness where titania particles (with an average particle size of 0.3 μm), for example, are dispersed.

Each of scanning lines 124 of the driving unit 123 is connected commonly to all the actuators 134 in the same row. The driving unit 123 supplies scan signals Vs in synchronization with the clock signal to the scanning lines 124, sequentially.

A light source driving unit (not illustrated) supplies brightness signals Ys in synchronization with the scan signals Vs to the light sources 30, sequentially. Thus, the light intensities of the light sources 30 are set in accordance with the brightness signals Ys.

The operation of the display device 120 with the above-described configuration will be described below.

Firstly, scan signals Vs are supplied sequentially to the scanning lines 124 by the driving unit 123, and brightness signals Ys synchronized with the scan signals Vs are supplied sequentially to the light sources 30 of the optical devices 121 by the light source driving unit.

When a scan signal Vs is supplied to a scanning line 124, the PZT piezoelectric element of the actuator 134 of each of the light exit portions 122 included in the row corresponding to the scanning line stretches so that the light scattering film 136 is brought into contact with the side surface of the optical waveguide 11 as FIG. 13B shows. Hence, the contact surfaces of the optical waveguide 11 and the light scattering film 136 fail to meet the conditions for the total-reflections for the light beams 133 within the optical waveguide 11. Consequently, the light beams 133 leak out into the light scattering film 136.

The leaked-out light beams 133 are scattered within the light scattering film 136 and partly travel back into the optical waveguide 11. The leaked-out light beams reaching the light reflective film 135 without being scattered sufficiently within the light scattering film 136 are reflected regularly by the light reflective film 135, then pass through the light scattering film 136 and travel back into the optical waveguide 11.

The light beams 133 are reflected by the light scattering film 136 in all directions. Hence, most of the light beams having traveled back in the optical waveguide 11 are not reflected totally by the side surface of the optical waveguide 11, but pass through the optical waveguide 11 to exit from the optical waveguide 11.

Accordingly, when a brightness signal Ys is supplied to the light source 30 of one of the optical devices 121, the light beams 133 in the optical waveguide 11 exit from the optical waveguide 11 at the intersection with the actuator 134 of the light exit portion 122 in the row corresponding to the scanning line 124 to which a scan signal Vs is supplied.

When no brightness signal Ys is supplied to the light source 30 of one of the optical devices 121, the light beams 133 in the optical waveguide 11 do not exit from the optical waveguide 11 at the intersection with the actuator 134 of the light exit portion 122 in the row corresponding to the scanning line 124 to which a scan signal Vs is supplied.

In contrast, the PZT piezoelectric element of the actuator 134 of each of the light exit portions 122 in the row corresponding to the scanning line 124 to which no scan signal Vs is supplied does not stretch, so that the light scattering film 136 continues to stay away from the side surface of the optical waveguide 11. Hence, irrespective of whether a brightness signal Ys is or is not supplied to the light source 30, the light beams 133 in the optical waveguide 11 of the optical device 121 do not exit from the optical waveguide 11 at the intersection with the actuator 134 of the light exit portion 122 in the row corresponding to the scanning line 124 to which a scan signal Vs is supplied.

In this way, when one of the light exit portions 122 is selected on the basis of the scan signals Vs and the brightness signals Ys, the light beams in the optical waveguide 11 exit from the optical waveguide 11 through the selected light exit portion 122, and the brightness of each pixel is modulated. Thus, an image is displayed on the display device 120.

As has been described thus far, in the ninth embodiment, the light sources 30 are connected respectively to the optical devices 121 in a linear manner, so that a large number of the optical devices 121 can be provided in close proximity to one another in a single plane. In addition, no mechanical interference occurs between two adjacent optical devices 121, so that a thin display device 120 with a high brightness and large screen can be obtained easily.

The description of the ninth embodiment assumes that the light entry portions 15 are formed in the first-end surface 11a of the optical waveguide 11, but any of the light entry portions described in the above-described embodiments may be employed. The display device 120 can have a brightness-improvement effect corresponding to the employed light entry portion. In addition, plural light entry portions of different kinds may be employed in a mixed manner.

The description of the ninth embodiment assumes that the actuator is a piezoelectric actuator. However, the actuator may be an electrostatic actuator.

What is claimed is:

1. An optical device comprising:
   a bar-shaped optical waveguide with either a polygonal or circular cross-sectional shape;
   a light entry portion formed in a circumferential area of a first-end surface of the optical waveguide and including a sloping surface having a normal vector containing a component in a circumferential direction of the first-end surface so as to cause an incident light beam to travel towards a second-end surface of the optical waveguide while repeating total reflections on a side surface of the optical waveguide without passing through a central portion in a cross section of the optical waveguide; and
   a light exit portion formed in the side surface of the optical waveguide and configured to let the light beam in the optical waveguide out of the optical waveguide.

2. The optical device according to claim 1, wherein the light entry portion includes:
   a first sloping surface extending from the first-end surface towards the second-end surface of the optical waveguide; and
   a second sloping surface extending from the first-end surface towards the second-end surface of the optical waveguide and intersecting the first sloping surface, a first intersection line of the first sloping surface and the second sloping surface extends from an outer edge towards the center of the first-end surface, and
   a second intersection line of the first sloping surface and the first-end surface is parallel to a third intersection line of the second sloping surface and the first-end surface.

3. The optical device according to claim 2, wherein the first sloping surface and the second sloping surface are two side surfaces of either a groove or a ridge.

4. The optical device according to claim 2, wherein the second intersection line and the third intersection line extend with a distance between the second intersection line and the third intersection line gradually widening from a center side towards the outer edge of the first-end surface.

5. The optical device according to claim 2, wherein each of the first sloping surface and the second sloping surface extends from one side to the opposite side of the outer edge through the center of the first-end surface.

6. The optical device according to claim 1, wherein the light entry portion is a spiral-shaped sloping surface formed in a circumferential area of the optical waveguide.

7. The optical device according to claim 2, wherein a reflective film to reflect the incident light beam is formed on either the first sloping surface or the second sloping surface.

8. The optical device according to claim 3, wherein a reflective film to reflect the incident light beam is formed on either the first sloping surface or the second sloping surface.

9. The optical device according to claim 4, wherein a reflective film to reflect the incident light beam is formed on either the first sloping surface or the second sloping surface.

10. The optical device according to claim 5, wherein a reflective film to reflect the incident light beam is formed on either the first sloping surface or the second sloping surface.

11. The optical device according to claim 1, wherein a reflective film to reflect the incident light beam is formed on the first-end surface except the sloping surface.

12. The optical device according to claim 1, wherein the incident light beam travels spirally.

13. A display device comprising:
a light source;
an optical device including
a bar-shaped optical waveguide with either a polygonal or circular cross-sectional shape,
a light entry portion formed in a circumferential area of a first-end surface of the optical waveguide and including a sloping surface having a normal vector containing a component in a circumferential direction of the first-end surface so as to cause an incident light beam emitted from the light source to travel towards a second end surface while repeating total reflections on a side surface of the optical waveguide without passing through a central portion of a cross section of the optical waveguide, and
a plurality of light exit portions arranged in a lengthwise direction of the optical waveguide and each configured to come into contact with a side surface of the optical waveguide by being moved by an actuator, and thereby to let the light beam in the optical waveguide out of the optical waveguide; and
a driving unit configured to drive the actuator.

14. The display device according to claim 13, wherein each of the light exit portions includes:
the actuator provided so as to be opposed to the side surface of the optical waveguide;
a light reflective film formed on an end surface of the actuator, the end surface being on a side closer to the optical waveguide; and
a light scattering film formed on the light reflective film, and the light scattering film is driven by the actuator to come into contact with one side of the side surface of the optical waveguide, and thereby lets the light beam in the optical waveguide out of the optical waveguide from the opposite side of the side surface of the optical waveguide to the side in contact with the light scattering film.

15. The display device according to claim 13, wherein the incident light beam travels spirally.

* * * * *